(12) United States Patent
Ishii et al.

(10) Patent No.: US 7,921,265 B2
(45) Date of Patent: Apr. 5, 2011

(54) DATA ACCESS METHOD, CHANNEL ADAPTER, AND DATA ACCESS CONTROL DEVICE

(75) Inventors: Takanori Ishii, Kawasaki (JP); Nina Tsukamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 699 days.

(21) Appl. No.: 12/068,355

(22) Filed: Feb. 5, 2008

(65) Prior Publication Data

US 2008/0195837 A1    Aug. 14, 2008

(30) Foreign Application Priority Data

Feb. 9, 2007  (JP) .................................. 2007-030753

(51) Int. Cl.
*G06F 12/00* (2006.01)
(52) U.S. Cl. ....................................................... 711/154
(58) Field of Classification Search .................... None
See application file for complete search history.

(56) References Cited

U.S. PATENT DOCUMENTS

| | | | | |
|---|---|---|---|---|
| 5,907,801 A * | 5/1999 | Albert et al. | ................... | 455/406 |
| 7,020,835 B2 | 3/2006 | Loaiza et al. | | |
| 7,480,850 B2 * | 1/2009 | Arataki et al. | ................. | 714/779 |
| 7,640,377 B2 * | 12/2009 | Matsuda et al. | ................. | 710/22 |

| | | | |
|---|---|---|---|
| 2006/0059408 A1 | 3/2006 | Chikusa et al. | |
| 2006/0129901 A1 | 6/2006 | Arataki et al. | |
| 2006/0215297 A1 | 9/2006 | Kikuchi | |

FOREIGN PATENT DOCUMENTS

| | | |
|---|---|---|
| JP | 02-199680 | 8/1990 |
| JP | 7-325673 | 12/1995 |
| JP | 9-288545 | 11/1997 |
| JP | 2001-325567 | 11/2001 |
| JP | 2003-36146 | 2/2003 |
| JP | 2005-524144 | 8/2005 |
| JP | 2006-79380 | 3/2006 |
| JP | 2006-164141 | 6/2006 |
| JP | 2006-268524 | 10/2006 |

OTHER PUBLICATIONS

Japanese Office Action mailed Feb. 3, 2009 and issued in corresponding Japanese Patent Application 2007-030753.

* cited by examiner

*Primary Examiner* — Hiep T Nguyen
(74) *Attorney, Agent, or Firm* — Staas & Halsey LLP (57) ABSTRACT

In an LSI implemented by a DMA chip, a BCC check block performs BCC check of cache data each time the cache data is read. In response to a check result indicating whether or not the check is completed, a CM read block turns on a BCC check bit and a BCC error bit of a data-transfer-end notification. Further, an FCC check block performs FCC check of the cache data. In response to a check result indicating whether or not the check is completed, the CM read block turns on an FCC check bit and an FCC error bit of the data-transfer-end notification. When data transfer is finished, the CM read block sends the data-transfer-end notification to a CPU via a descriptor block.

9 Claims, 8 Drawing Sheets

DATA ACCESS METHOD, CHANNEL ADAPTER, AND DATA ACCESS CONTROL DEVICE

BACKGROUND OF THE INVENTION

1. Field of the Invention

The present invention relates to a data access method, a channel adapter, and a data-access control device which read/write, in response to an instruction from an external apparatus, data to/from a data storing memory that stores variable-length data for each block including predetermined fields.

2. Description of the Related Art

Magnetic disk devices having a data format of variable-length records are used as external storage devices for mainframe systems that run on vender-unique operating systems.

Disk array devices (which are also referred to as "RAID (Redundant Arrays of Inexpensive Disk) devices") having a configuration that enhances high-speed data access and data-failure resistance are often used as external storage devices used for information processing systems. Since the disk array devices are often used in open systems that run on different types of general-purpose operating systems, they have data formats of fixed-length records.

In recent years, with the advancement of information processing technology, information processing terminals have been widely used, and cases in which an information processing system is configured with a combination of a mainframe system and an open system are increasing. Thus, the disk array device for storing data in a fixed-length data format is configured so as to allow data to be accessed from the mainframe system.

In light of such a situation, for example, Japanese Unexamined Patent Application Publication No. 2006-164141 discloses a data write method for enhancing the reliability of data to be written to a cache memory. In this method, when a variable-length record is written to a cache memory of a CA (channel adapter) that manages data of a fixed-length data record by using a fixed-length, an FCC (field check code) is added to a field of the viable-length record and a BCC (block check code) is added to an LBA (logical block addressing).

Japanese Unexamined Patent Application Publication No. 2003-36146 discloses a disk-array control method. In the disk-array control method, an addition check code is added to data written to disks constituting a parity group of a disk array device and all addition check codes of the parity group are written to a parity disk. During data reading, the addition check codes in the parity disk are read to check data.

Japanese Unexamined Patent Application Publication No. 2006-79380 discloses a disk array device. In the disk array device, part of data to be written to a disk is stored in a management area and computation data generated based on part of the data is embedded in the data to thereby performing writing to the disk. When reading the data from the disk, the disk array device extracts the computation data embedded in the data to perform predetermined computation, and compares the result of the computation with the part of the data stored in the management area to check the validity of the read data.

SUMMARY

It is an object of the present invention is to provide a data access method, a channel adapter, and a data-access control device, which performs both data verification based on the block data verification code and data verification based on the field data verification code to detect an error when variable-length data is read from the data storing memory.

An aspect of the present invention relates to a data access method for writing/reading, in response to an instruction from an external apparatus, data to/from a data-storing memory that manages variable-length data by using a block including predetermined fields. The data access method includes a verifying step of verifying the variable-length data for each block based on a block data verification code attached to the block and verifying the variable-length data for each field based on a field data verification code attached to the field, during reading of the variable-length data from the data-storing memory, and a verification-result-notification issuing step of issuing a notification indicating a result of the verification performed in the verifying step to the external apparatus.

Another aspect of the present invention provides a channel adapter for writing/reading, in response to an instruction from an external apparatus, data to/from a data-storing memory that manages variable-length data by using a block including predetermined fields. The channel adapter includes verifying unit for verifying the variable-length data for each block based on a block data verification code attached to the block and verifying the variable-length data for each field based on a field data verification code attached to the field, during reading of the variable-length data from the data-storing memory, and verification-result-notification issuing unit for issuing a notification indicating a result of the verification performed by the verifying unit to the external apparatus.

Still another aspect of the present invention provides a data-access control device for controlling data access for writing/reading, in response to an instruction from an external apparatus, data to/from a data-storing memory that manages variable-length data by using a block including predetermined fields. The data-access control device includes verifying unit for verifying the variable-length data for each block based on a block data verification code attached to the block and verifying the variable-length data for each field based on a field data verification code attached to the field, during reading of the variable-length data from the data-storing memory, and verification-result-notification issuing unit for issuing a notification indicating a result of the verification performed by the verifying unit to the external apparatus.

According to the present invention, when the variable-length data is read from the data-storing memory, the variable-length data is verified for each block based on the block data verification code attached to the block and the variable-length data is verified for each field based on the field data verification code attached to the field. Thus, it is possible to promptly detect a data error. It is also possible to issue a notification indicating the data error to the external apparatus for reporting.

DESCRIPTION OF THE PREFERRED EMBODIMENT

A data access method, a channel adapter, and a data-access control device according to an embodiment of the present invention will be described in detail with reference to the accompanying drawings. A data access method, a channel adapter, and a data-access control device according to the present embodiment manages data storing a variable-length-data format data in a fixed-length data format, and are applicable to a storage device (data-storing memory) that is capable of accessing both fixed-length data and variable-length data. A device for implementing such a data access method will be described in conjunction with an example of channel adapters (CAs) for writing/reading data to/from cache memories (CMs) in a disk array device.

Figure 1:
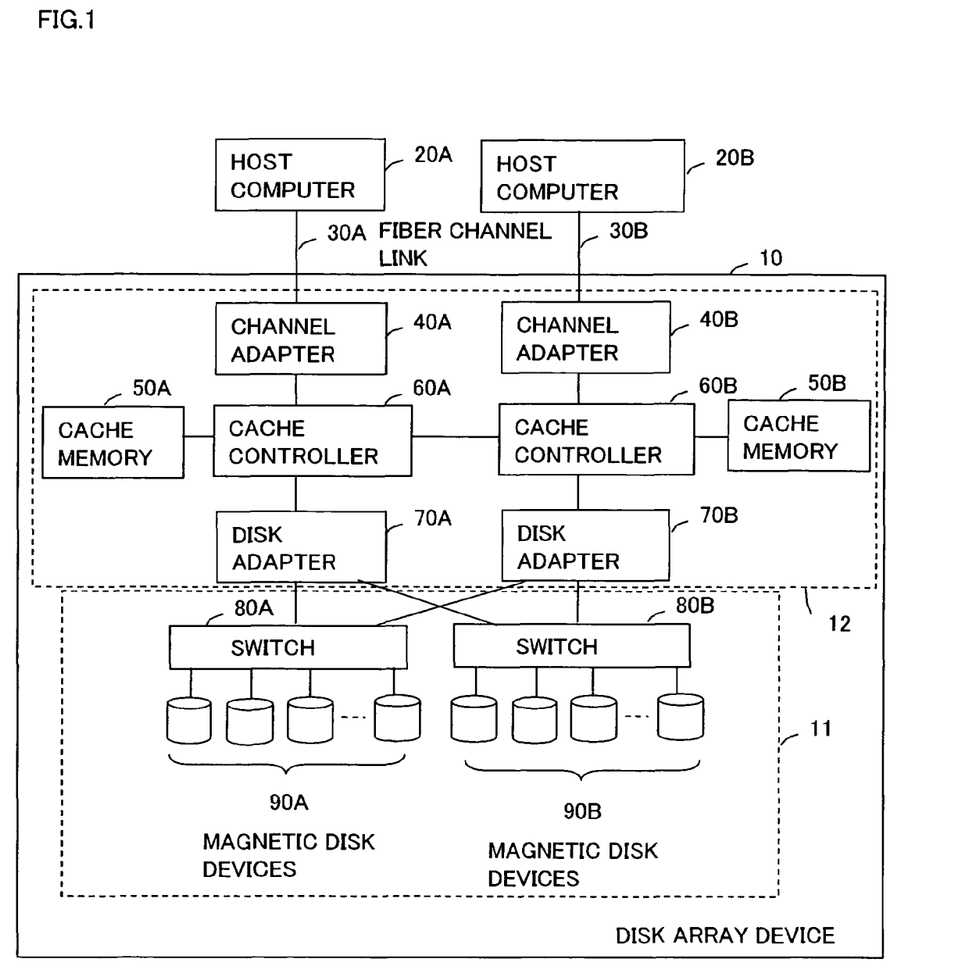
FIG. 1 is a schematic diagram showing the configuration of a disk array device according to an embodiment.

The configuration of a disk array device according to an embodiment of the present invention will first be described. FIG. 1 is a schematic block diagram showing the configuration of a disk array device according to an embodiment. A disk array device 10 functions as an external storage device for host computers 20A and 20B serving as external apparatuses, and includes a disk array unit 11 for storing data, and a disk array controller 12 for controlling the disk array unit.

The disk array unit 11 includes multiple magnetic disk devices 90A and multiple magnetic disk devices 90B and switches 80A and 80B for switching between the magnetic disk devices 90A and 90B. In general, the magnetic disk devices 90A and 90B have different configurations depending on the RAID (Redundant Array of Inexpensive Disks) levels classified according to the data access speeds and the data redundancy levels.

That is, the applications of the magnetic disk devices vary according to the RAID levels. Examples include a magnetic disk device for storing data, a magnetic disk device for mirroring the data stored in the magnetic disk device, and a magnetic disk device for storing parity data created for the data stored in the magnetic disk device. It is assumed that the magnetic disk devices 90A and 90B store data in a fixed-length data format.

The disk array controller 12 includes channel adapters 40A and 40B, cache memories 50A and 50B, cache controllers 60A and 60B, and disk adapters 70A and 70B. The channel adapters 40A and 40B perform interface control on the host computers 20A and 20B, respectively. The cache memories 50A and 50B temporarily store data read from the magnetic disk devices 90A and 90B. The cache controllers 60A and 60B perform various types of control during data reading/writing, and manage the cache memories 50A and SOB, respectively. During data reading/writing, the disk adapters 70A and 70B control the corresponding magnetic disk devices 90A and 90B, based on instructions from the cache controllers 60A and 60B, respectively.

The cache controller 60A and 60B have functions for reading, when data for which a reading instruction is issued from the host computer 20A or 20B is not stored in the cache memory 50A or 50B, data from the corresponding magnetic disk device 90A or 90B and for placing the read data on the cache memories 50A or 50B so as to allow the data to be read by the channel adapters 40A or 40B.

When the capacity of the cache memory 50A or 50B is filled, data that are not used, data that are left for a certain period of time after being accessed last time, and so on are erased to reserve areas for writing new data. The cache controllers 60A and 60B also have functions for issuing instructions to the disk adapters 70A and 70B so as to write data, written to the cache memories 50A and 50B in response to writing requests from the host computers 20A and 20B, to the magnetic disk devices 90A and 90B.

The cache memories 50A and 50B, which serve as data storing memories, have functions for storing data read from the magnetic disk devices 90A and 90B under the control of the cache controllers 60A and 60B and for storing data for which write requests are issued from the host computers 20A and 20B.

The disk adapters 70A and 70B have functions for reading data from the magnetic disk devices 90A and 90B and for writing data to the magnetic disk devices 90A and 90B in accordance with instructions from the cache controllers 60A and 60B.

The channel adapters 40A and 40B have a function for reading, from the cache memories 50A and 50B, data corresponding to read requests issued from the host computers 20A and 20B, a function for transferring the read data to the host computers 20A and 20B, and a function for writing, to the cache memories 50A and 50B, data for which write requests were issued from the host computers 20A and 20B.

With the configuration described above, a data access method is applicable to data writing between the channel adapters 40A and 40B and the corresponding cache memories 50A and 50B. A description will now be given of format conversion and check codes for transferring data between the channel adapters 40A and 40B and the corresponding cache memories 50A and 50B.

A CKD (count-key-data) format is used as a variable-length data format to store variable-length-data format data in a fixed-length data format. A record in the CKD format includes three portions, i.e., a count portion (Count), a key portion (Key), and a data portion (Data). The count portion has a fixed length and includes the address of the record and the information of the data length. The key portion has a variable length and is used to allow an operating system to identify the record. The data portion has a variable length and is an area for storing user data. The count portion, the key portion, and the data portion are called "fields".

The magnetic disk devices 90A and 90B manage the variable-length data passed from the host computers 20A and 20B by using fixed-length logical blocks. The fixed length in this case is 512 bytes. The cache memories 50A and 50B store data in which an 8-byte error check code (hereinafter referred to as a "block check code (BCC)", which indicates a result of error check performed for each 512 byte logical block called an LBA, is attached to the end of the LBA. That is, data written to the cache memories 50A and 50B are followed by an 8-byte BCC for error prevention for each LBA, and have a total data length of 520 bytes.

An 8-byte error check code (hereinafter referred to as a "field check code (FCC)") for error protection is attached to each field. The 8-byte FCC is attached to the end of each field. Thus, the LBA has 512 bytes including an 8-byte FCC for each of the count portion, the key portion, and the data portion.

It is desired that the BCC be generated as a result of calculation using entire data in the LBA and it is also desired that the FCC be generated as a result of calculation using entire data in each field. For example, as an error check method, cyclic redundancy check (CRC) may be used to use a CRC code generated thereby, but it is not limited thereto. Other codes, such as humming code, may be used.

Figure 2:
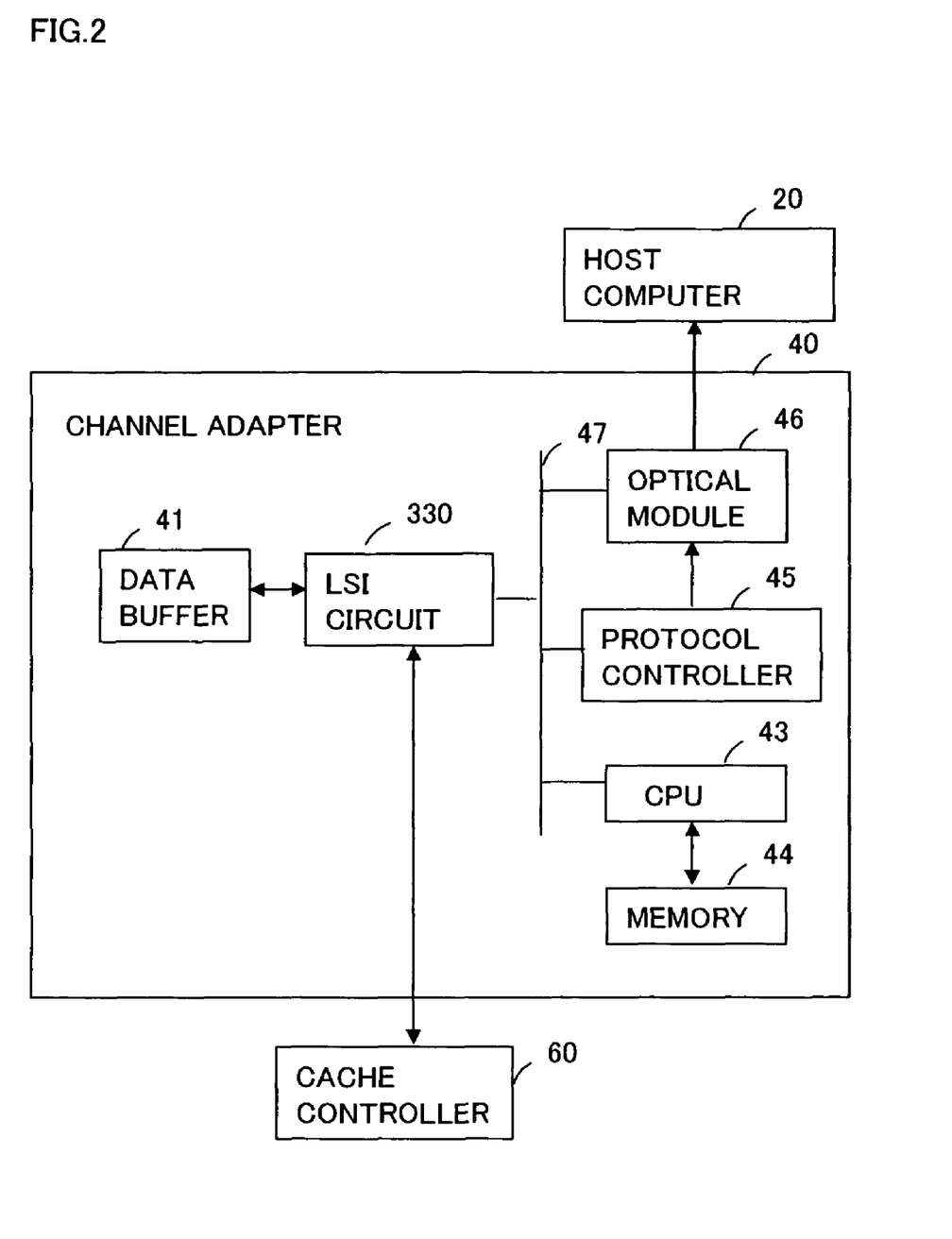
FIG. 2 is a block diagram showing the internal configuration of a channel adapter according to the embodiment.

Next, a description will be given of the configuration of the channel adapters 40A and 40B in the disk array device 10 for implementing data writing method according to the present embodiment. FIG. 2 is a block diagram showing the internal configuration of a channel adapter according to the present embodiment. The channel adapter 40 includes a data buffer 41, an LSI (large scale integration) circuit 330, a CPU (central processing unit) 43, a memory 44, a protocol controller 45, an optical module 46. The LSI circuit 330, the CPU 43, and the protocol controller 45 are connected through a bus and can transfer data to each other.

The LSI circuit 330 serves as an interface with a cash controller 60. The LSI circuit 330 is located between the host computer 20 for issuing an access request such as data writing request and the cache memory 50A or 50B. The LSI circuit 330 has a DMA (direct memory access) function for transferring data between the host computer 20 and the cache memory 50A or 5B without going through the CPU 43, while causing the data buffer 41 to buffer the data. The LSI circuit 330 performs communication processing with the cache controller 60 in accordance with an instruction from the CPU 43.

FIG. 2 illustrates a case in which the host computer 20 and the disk array device 10 are connected to each other through an optical fiber. The optical module 46 and the protocol controller 45 are provided at the side at which the LSI circuit 330 is connected to the host computer 20. The optical module 46 converts optical signals, received from the host computer 20, into electrical signals and converts electrical signals, sent from the disk array device 10 into optical signals. The protocol controller 45 controls the protocol of a fiber channel used for connecting the LSI 330 and the host computer 20.

The CPU 43 is an LSI circuit having a processor and a memory interface portion which control the entire operation of the channel adapter 40, and has a data processing block (not shown) that serves as a functional module related to a data writing method. The data processing block has a function for generating a descriptor required for writing or updating data having the CKD format to the cache memory 50A or 50B.

For example, the data processing block has a function for generating a descriptor for writing CKD-format data to the cache memory 50A or 50B and a function for exchanging, before receiving update data having the CKD format, information regarding the data with the host computer 20 to obtain update information regarding a field to be updated in the received update information. The data processing function further has a function for generating a descriptor for executing data update processing (hereinafter referred to as "read-modify-write processing") based on the received update information and the update information. The term "descriptor" describes a procedure needed for the LSI circuit 330 to execute data access processing.

The memory 44 is connected to the CPU 43 to serve a storage device for storing data and so on used for the processing of the CPU 43. The memory 44 has a descriptor storage area (not shown) for storing descriptors generated by the data processing block of the CPU 43.

Figure 3:
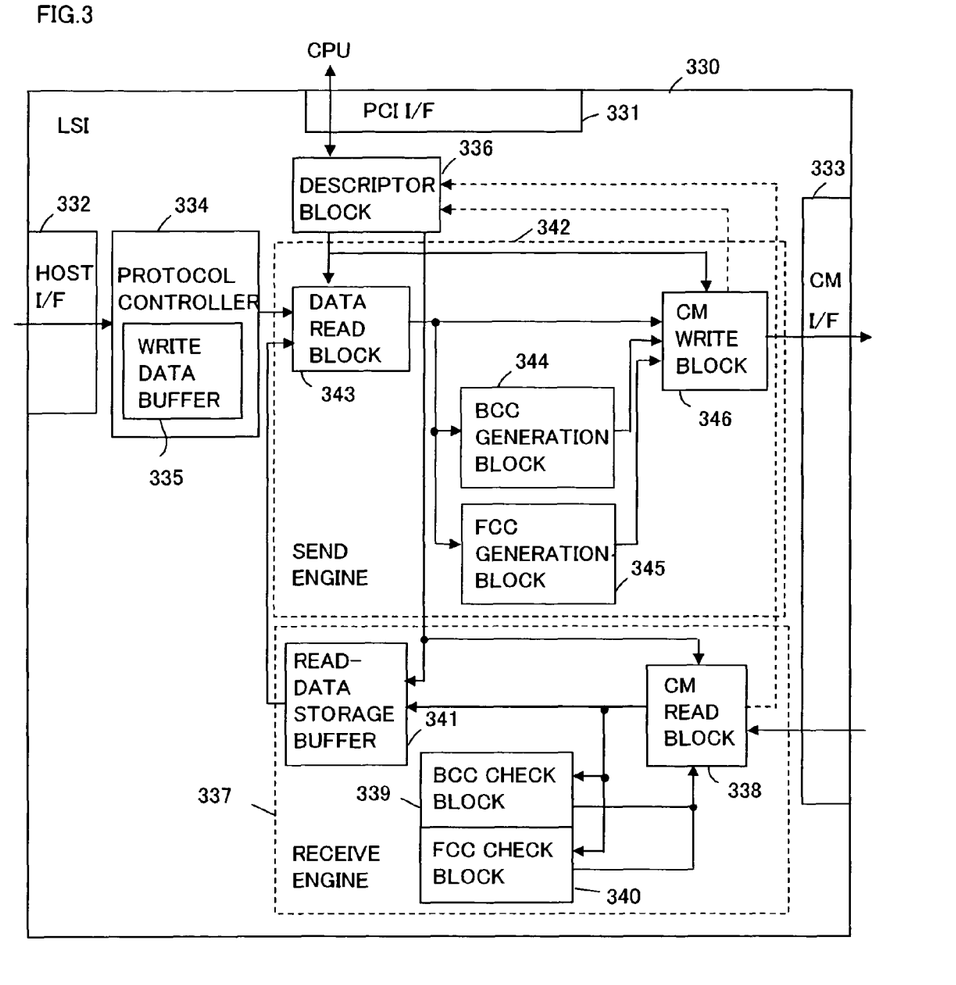
FIG. 3 is a functional block diagram showing the configuration of an LSI circuit according to the embodiment.

A description is now given of the configuration of the LSI circuit 330 in the channel adapter 40 for implementing the data writing method according to the present embodiment. FIG. 3 is a functional block diagram showing the configuration of the LSI circuit 330 according to the present embodiment. The LSI circuit 330 may be implemented by a DMA (direct memory access) chip.

The LSI circuit 330 includes a peripheral-control-interconnect interface (PCI I/F) 331 serving as an interface with the CPU 43, a host I/F 332 serving as an interface with the host computer 20, a CM I/F 333 serving as an interface with the cache controllers 60A or 60B, and a protocol controller 334 for controlling the protocol of a fiber channel used for connection with the host computer 20. The LSI circuit 330 further includes a descriptor block 336 for reading a descriptor that the CPU 43 set in the memory 44, a receive engine 337 for performing processing when data is read from the cache memory 50A or 50B, and a send engine 342 for performing data processing on the cache memory 50A or 50B in response to a data write request from the host computer 20.

The protocol controller 334 has a write data buffer 335 for storing data (hereinafter referred to as write data) for which a write request is sent from the host computer 20 and data (hereinafter referred to as update data) for which an update request is sent from the host computer 20. The descriptor block 336 has functions for reading a descriptor that the data processing block of the CPU 43 stored in the memory 44 and for issuing a notification indicating the read descriptor information to an associated processing unit.

The receive engine 337 is a module for reading data from the cache memory 50A or 50B. The receive engine 337 includes a CM read block 338 for performing processing for reading cache data from the cache memories 50A or 50B, a BCC check block 339 for ensuring the cache data read from the cache memory 50A or 50B for each logical block, an FCC check block 340 for ensuring the cache data read from the cache memory 50A or 50B for each field, and a read-data storage buffer 341 for storing the cache data read by the CM read block 338.

The CM read block 338 performs processing for reading cache data from the cache memory 50A or 50B based on a cache address field described in a descriptor for data reading and also performs processing for writing the read cache data to a read-data storage buffer address designated in the data-reading descriptor. In accordance with the designation in the data-reading descriptor, the CM read block 338 passes the read data to the BCC check block 339 or the FCC check 340.

The CM read block 338 issues a data-transfer-end notification to the CPU 43 via the descriptor block 336, after writing data to the read-data storage buffer 341 is finished. The data-transfer-end notification includes a bit indicating whether or not BCC check has been performed, a bit indicating a BCC check result, a bit indicating whether or not an FCC check has been performed, and a bit indicating an FCC check result.

The BCC check block 339 has a function for checking whether or not data stored in the read-data storage buffer 341 has an error by performing error check for each logical block with respect to the cache data passed from the CM read block 338 and performing comparison with a block check code attached to the logical block. Upon completion of the checking, the BCC check block 339 issues a notification indicating the completion to the CM read block 338. Upon receiving the completion notification, the CM read block 338 turns on the BCC check bit (indicating whether or not BCC check has been performed) contained in the data-transfer-end notification. When the CM read block 338 does not receive the completion notification, it turns off the BCC check bit contained in the data-transfer-end notification.

Upon determining that there is an error, the BCC check block 339 issues a notification indicating that the data read from the cache memory 50A or 50B has an error to the CPU 43 to terminate processing being executed, regardless of the setting designated by the data-reading descriptor. The BCC check block 339 further issues a notification indicating the error to the CM read block 338. Upon receiving the error notification, the CM read block 338 turns on the BCC error bit (indicating a BCC check result) contained in the data-transfer-end notification. When the CM read block 338 does not receive the error notification, it turns off the BCC error bit contained in the data-transfer-end notification.

The FCC check block 340 has a function for checking whether or not data stored in the read-data storage buffer 341 has an error by performing error check for each field with respect to the cache data received from the CM read block 338 and performing comparison with a field check code (FCC) attached to the field. Upon completion of the checking, the FCC check block 340 issues a notification indicating the completion to the CM read block 338. Upon receiving the completion notification, the CM read block 338 turns on the FCC check bit (indicating whether or not FCC check has been performed) contained in the data-transfer-end notification. When the CM read block 338 does not receive the completion notification, it turns off the FCC check bit contained in the data-transfer-end notification.

Upon determining that there is an error, the FCC check block 340 issues a notification indicating that the data read from the cache memory 50A or 50B has an error to the CPU 43 to terminate processing being executed, regardless of the setting designated by the data-reading descriptor. The FCC check block 340 further issues a notification indicating the error to the CM read block 338. Upon receiving the error notification, the CM read block 338 turns on the FCC error bit (indicating an FCC check result) contained in the data-transfer-end notification. When the CM read block 338 does not receive the error notification, it turns off the FCC error bit contained in the data-transfer-end notification.

When the field-length designation of the data-reading descriptor has an error, the checking as to whether or not the data stored in the read-data storage buffer 341 has an error is not performed, and thus, the checking is not completed. The CM read block 338, therefore, turns off the FCC check bit contained in the data-transfer-end notification.

When the data transfer is completed, the CM read block 338 sends the data-transfer-end notification to the CPU 43 via the descriptor block 336. In this manner, the data-transfer-end notification is sent to the CPU 43 via the descriptor block 336, so that it is possible to determine whether or not the results of the BCC check and FCC check are normal results and it is also possible to determine whether or not the BCC check and the FCC check have been performed and completed. Thus, the host computer 20 that issued an instruction for a data operation can determine whether or not the results of the BCC check and FCC check are normal results and also can determine whether or not the BCC check and the FCC check have been performed and completed.

The read-data-storage buffer 341 stores, at an address designated by the data-reading descriptor, cache data that the CM read block 338 read from the cache memory 50A or 50B.

The send engine 342 is a module for transferring data that is to be newly written and data to be updated from the host computer 20 to the cache memory 50A or 50B. The send engine 342 includes a data read block 343 for reading data to be written to the cache memory 50A or 50B, a BCC generation block 344 for generating a field check code for each logical block with respect to the read data, and an FCC generation block 345 for generating, when the read data has an update field containing contents to be updated, a field check code for the field portion. The send engine 342 further includes a CM write block 346 for generating data having a logical block length which are to be written to the cache memory 50 or 50B based on the data from the data read block 343, the BCC generation block 344, and the FCC generation block 345.

The data read block 343 has a function for selectively reading data from the data buffer 335 of the protocol controller 334 or the read-data storage buffer 341 of the receive engine 337 for each field, based on a descriptor for data writing. Specifically, when the data-writing descriptor indicates new-data writing, the data read block 343 performs processing for reading write data stored in the write data buffer 335 of the protocol controller 334 and passing the read data to the CM write block 346, the BCC generation block 344, and the FCC generation block 345.

When the data-writing descriptor indicates update-data writing, i.e., read-modify-write processing, the data read block 343 performs processing for reading a field containing contents to be updated (the field will hereinafter be referred to as an "update field") from the write data buffer 335 of the protocol controller 334, passing the read data to the CM write block 346, the BCC generation block 344, and the FCC generation block 345, reading a field containing contents that is not to be updated from the read-data storage buffer 341 of the receive engine 337, and passing the read data to the CM write block 346 and the BCC generation block 344.

The BCC generation block 344 has a function for calculating and generating a BCC for each logical block with respect to the data passed from the data read block 343, based on the data-writing descriptor, and a function for outputting the generated BCC to the CM write block 346. In this case, when write data is to be newly written or when a field containing contents to be updated by the read-modify-write processing is to be written, a BCC value to be added to a predetermined position in the field is obtained from the FCC generation block 345 and is calculated.

As described above, since the data read block 343 switches between data to be read, cache data stored in the read-data storage buffer 341 is used for a field that is not updated, and update data stored in the write data buffer 335 is used for an update field.

When the data read block 343 is transmitting data from the write data buffer 335 of the protocol controller 334, i.e., is transmitting an update field containing contents to be updated, the FCC generation block 345 has a function for calculating and generating an FCC for each field with respect to the data, based on the data-writing descriptor. The FCC generation block 345 has a function for outputting the generated FCC to the CM write block 346.

The CM write block 346 has a function for generating an LBA for writing to the cache memory 50A or 50B by using the data passed from the data read block 343, a BCC-CRC input from the BCC check block 339, and an FCC input from the FCC check block 340, based on the data-writing descriptor.

More specifically, in the disk array device 10 according to the present embodiment, data is managed by an LBA having a fixed length of 512 bytes. Thus, when data from the data read block 343 reaches 512 bytes, processing in which a BCC is attached to the data is performed.

When data is to be newly written, processing for adding an FCC is added to a predetermined position of a field write block containing the end portion of each file, and when update a field containing update contents is included in a logical block, an FCC is added to a predetermined position of a field write block containing the end of the field.

Figure 4A:
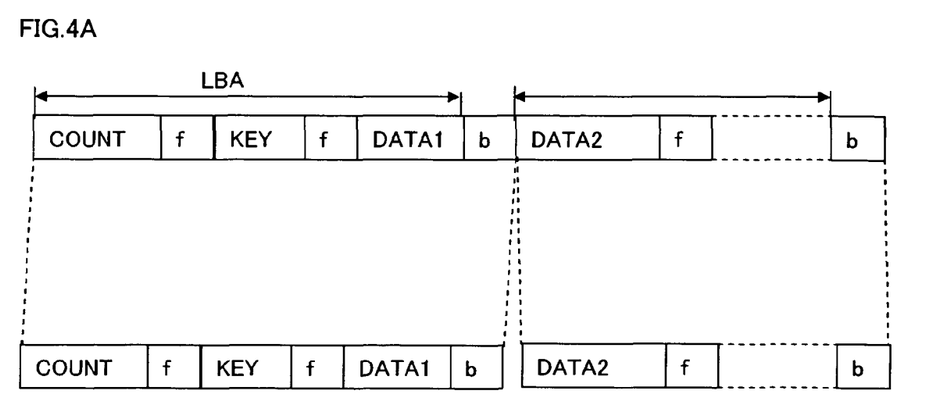
FIGS. 4A and 4B are diagrams showing a BCC check method.
Figure 4B:
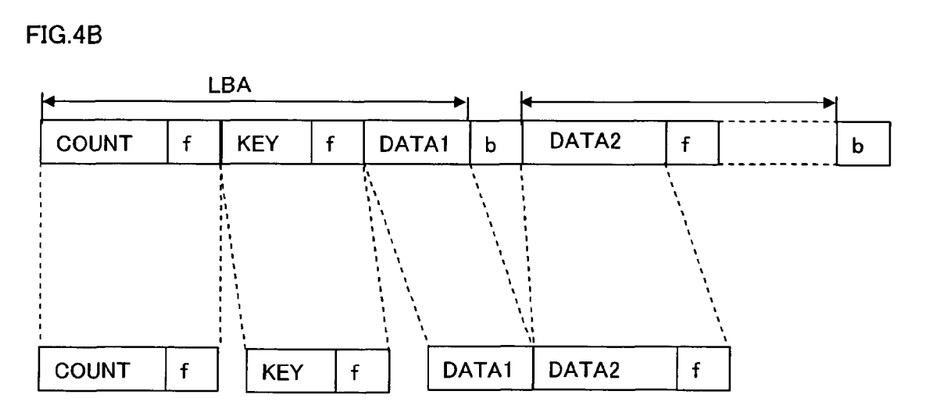

A description is now given of a BCC check method and an FCC check method which are performed by the LSI circuit 330 shown in FIG. 3. FIG. 4A is a diagram showing a BCC check method and FIG. 4B is a diagram showing an FCC check method. Variable-length data "Count+Key+Data 1+Data 2" from the host computer 20 has one LBA including "Count"+"FCC of Count"+"Key"+"FCC of Key"+"Data 1", a BCC is added to each LBA, and the resulting data is stored in the magnetic disk devices 90A and 90B. "Data 2"+"FCC of Data 2" and padding data are contained in one LBA, BCC is added to each LBA, and the resulting data is stored in the magnetic disk devices 90A and 90B.

As shown in FIG. 4A, when the data is read from the magnetic disk device 90A or 90B, the BCC for each LBA is verified to verify the validity of the read data. As shown in FIG. 4B, when the data is read from the magnetic disk device 90A or 90B, the FCC for each of "Count", "Key", and "Data 1+Data 2" is verified to verify the validity of the read data.

No FCC is added to each of "Data 1" and "Data 2" which are division units of user data, and an FCC is added to only "Data 2", which is the end of the division units. The FCC is generated based on the entire user data. That is, when user data divided into LBA units do not contain its end, no FCC is added thereto.

Figure 5A:
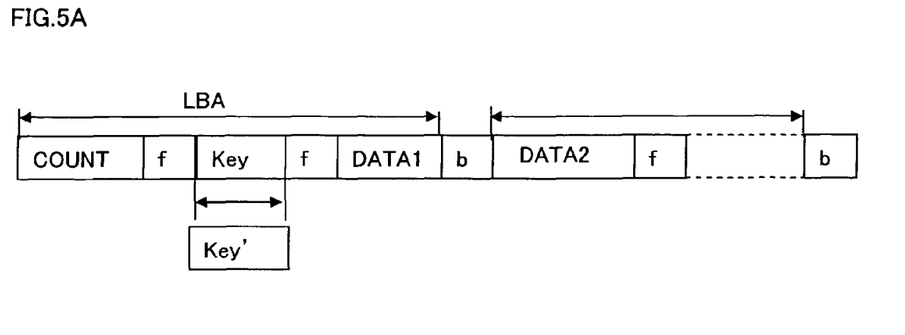
FIGS. 5A to 5C are diagrams showing a series of processing when read-modify-write processing is properly performed.
Figure 5B:
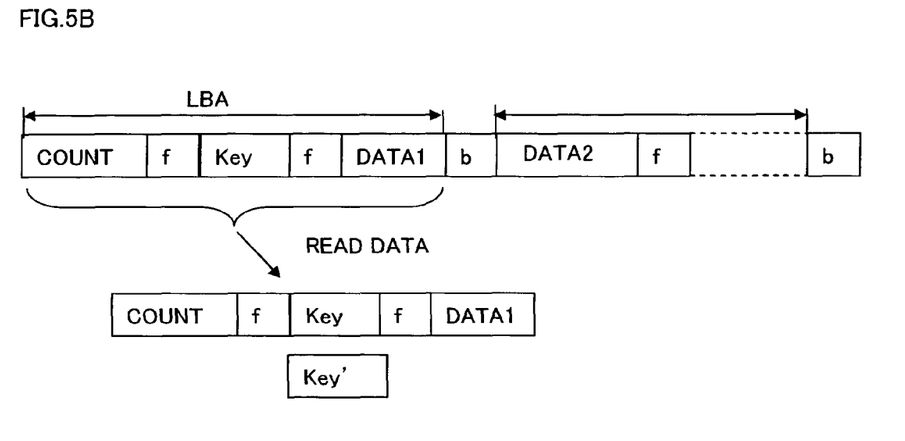
Figure 5C:
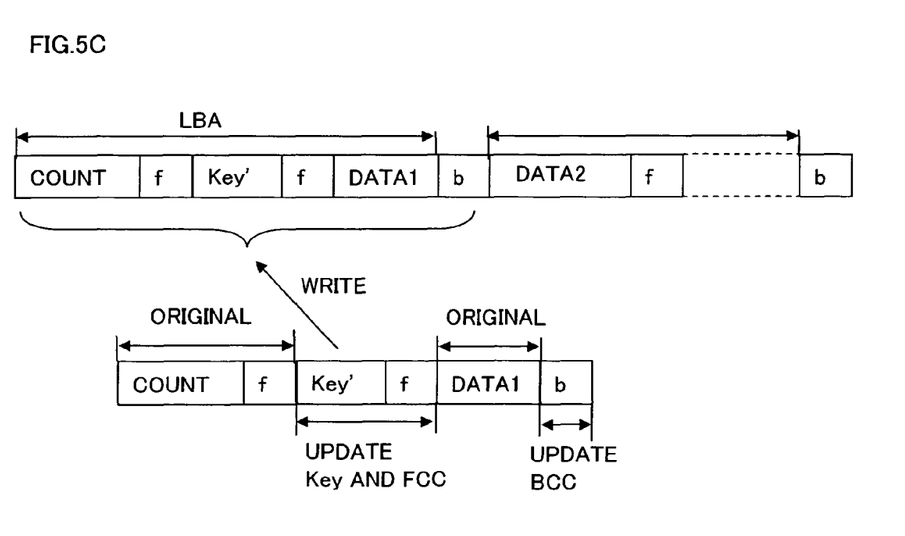
Figure 6A:
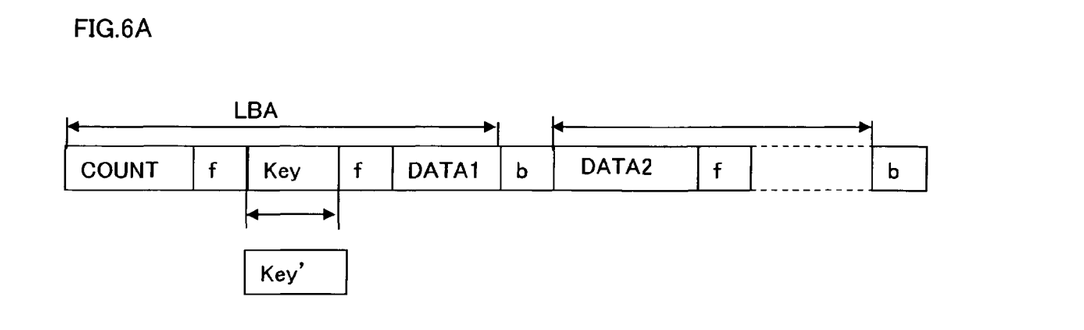
FIGS. 6A to 6C are diagrams showing a series of processing when read-modify-write processing is not properly performed.
Figure 6B:
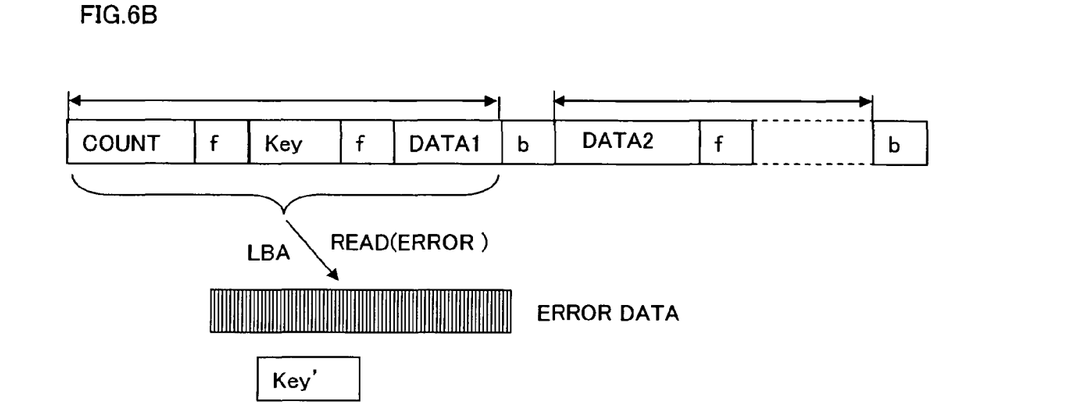
Figure 6C:
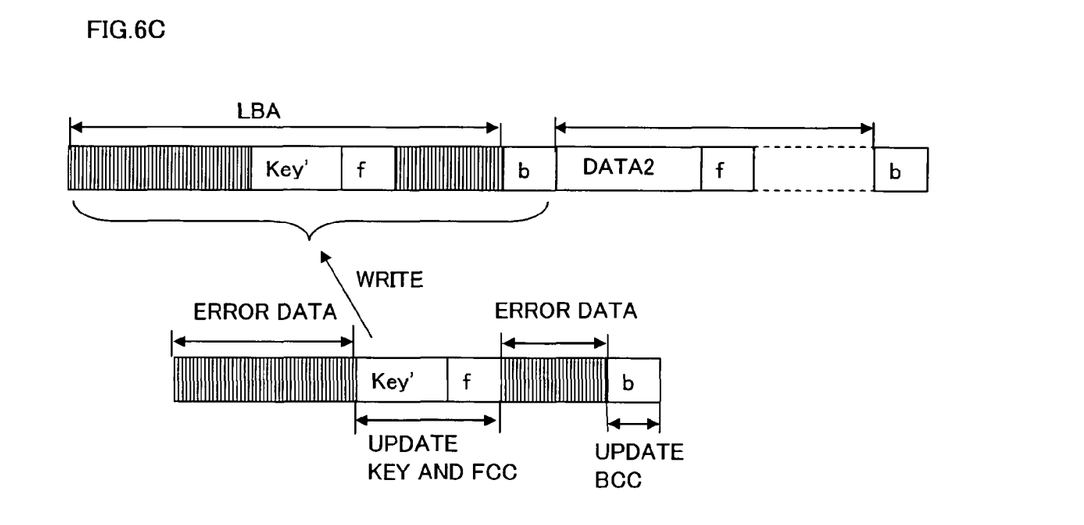

A series of operations when the read-modify-write processing is performed will be described next. FIGS. 5A to 5C are diagrams showing a series of processing when the read-modify-write processing is properly performed. FIGS. 6A to 6C are diagrams showing a series of processing when the read-modify-write processing is not properly performed.

It is assumed that a "Key" portion of data in the cache memory 50A or 50B (CM) is to be updated, as shown in FIG. 5A. It is also assumed that, for this change, update data (Key') is transmitted from the host computer 20 (HOST).

An LBA containing "Key" to be updated is read from the CM (see FIG. 5B). Then, after the "Key" is updated with the "Key'", the FCC of the "Key" is updated with the FCC of the "Key'" and the BCC of the LBA is recalculated and updated. Thereafter, the LBA is rewritten to the CM (see FIG. 5C).

In this manner, when the reading of the LBA from the CM is properly performed during the read-modify-write processing, there is no problem even if FCC check and BCC check are not performed.

However, as shown in FIG. 6A, when a "Key" portion of data in the cache memory 50A or 50B (CM) is to be updated and update data "Key'" is sent from the host computer 20 (HOST) for update, there is a case in which the LBA is not properly read from the CM during the read-modify-write processing (see FIG. 6B). In this case, if FCC check and BCC check are not performed during the reading, as shown in FIG. 6C, even if the "Key" is updated with the "Key'" and the FCC of the "Key" is updated with the FCC of the "Key'", the BCC of the resulting LBA is recalculated and updated, and the resulting LBA is rewritten to the CM, a BCC for the LBA still appears to be normal. Consequently, the data error is not detected.

In order to eliminate such a disadvantage, the FCC check and the BCC check are always performed when an LBA is read from the CM. This ensures data during the read modify write processing. The FCC check and the BCC check are always performed not only during the read-modify-write processing but also during data writing. This makes it possible to promptly detect a data-read error that can occur during the reading of an LBA from the CM.

Figure 7A:
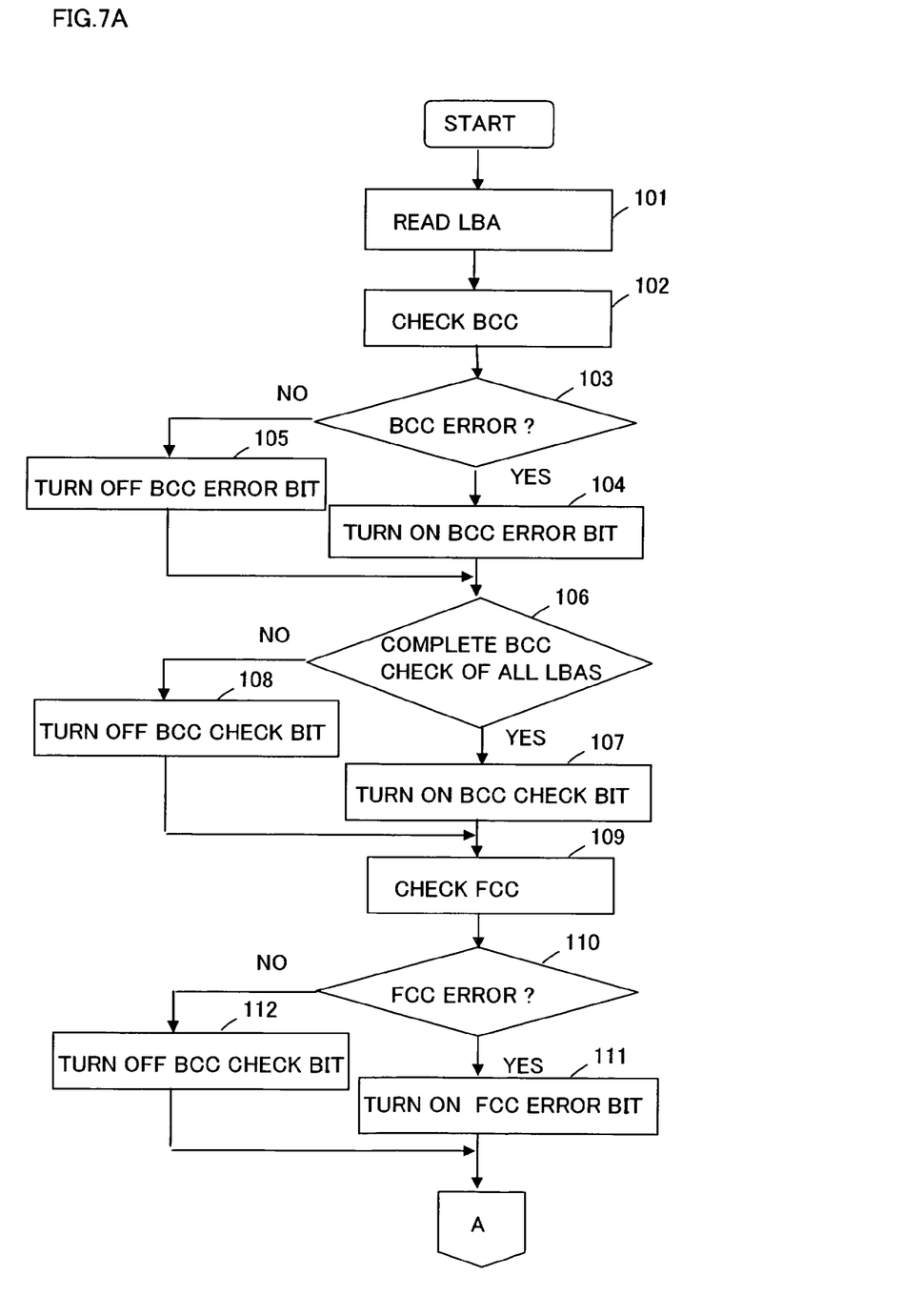
FIG. 7A to 7B are flowcharts showing a processing procedure for issuing a notification for a read-modify-write error check result.
Figure 7B:
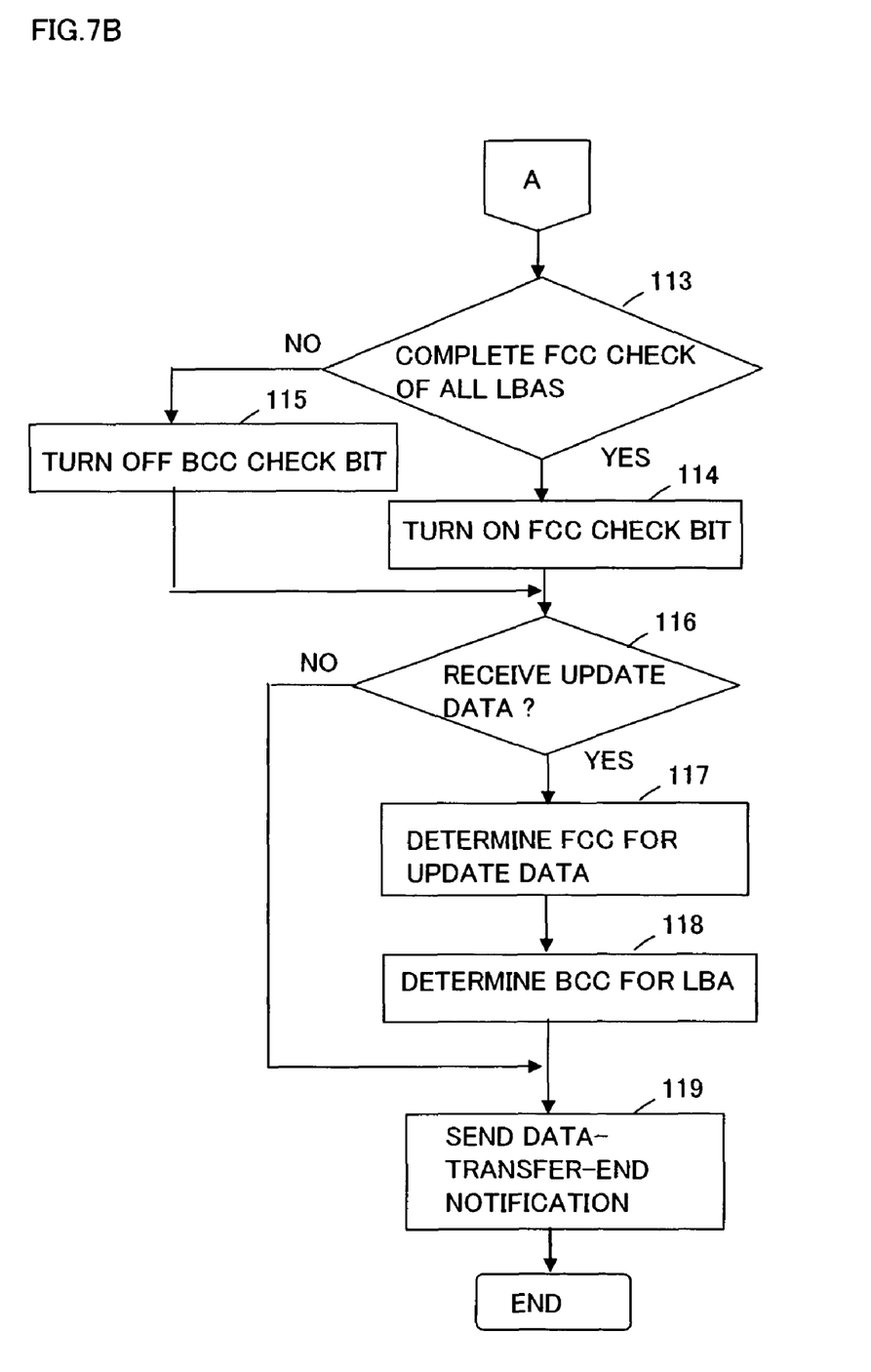

A description is now given of a read-modify-write error-check-result notification processing procedure performed by the LSI circuit 330 shown in FIG. 3. FIG. 7 is a flowchart showing a read-modify-write error-check-result notification processing procedure. As shown in FIG. 7, the CM read block 338 first reads LBAs to be updated from the cash memories 50A or 50B (in step S101), in response to a data operation from the host computer 20.

Subsequently, the BCC check block 339 performs BCC check of all LBAs read from the CM and issues a notification indicating a check result to the CM read block 338 (in step S102). Thereafter, the BCC read block 338 determines whether or not there is a BCC error (in step S103). When there is a BCC error (affirmative in step S103), the CM read block 338 turns on the BCC error bit of the data-transfer-end notification (in step S104). When there is no BCC error (negative in step S103), the CM read block 338 turns off the BCC error bit of the data-transfer-end notification (in step S105). When step S105 is finished, the process proceeds to step S106.

Subsequently, the CM read block 338 determines whether not the BCC check of all LBAs read from the CM has completed (in step S106). When the BCC check has been completed (affirmative in step S106), the CM read block 338 turns on the BCC check bit of the data-transfer-end notification (in step S107). When the BCC check has not been completed (negative in step S106), the CM read block 338 turns off the BCC check bit of the data-transfer-end notification (in step S108). When step S108 is finished, the process proceeds to step S109.

Subsequently, the FCC check block 340 performs FCC check of all LBAs read from the CM and issues a notification indicating a check result to the CM read block 338 (in step S109). Thereafter, the CM read block 338 determines whether or not there is an FCC error (in step S110). When there is an FCC error (affirmative in step S110), the CM read block 338 turns on the FCC error bit of the data-transfer-end notification (in step S111). When there is no FCC error (negative in step S110), the CM read block 338 turns off the FCC error bit of the data-transfer-end notification (in step S112). When step S112 is finished, the process proceeds to step S113.

Subsequently, the CM read block 338 determines whether or not the FCC check of all LBAs read from the CM has completed (in step S113). When the FCC check has been completed (affirmative in step S113), the CM read block 338 turns on the FCC check bit of the data-transfer-end notification (in step S114). When the FCC check has not been completed (negative in step S113), the CM read block 338 turns off the FCC check bit of the data-transfer-end notification (in step S115). When step S115 is finished, the process proceeds to step S116.

Subsequently, the data read block 343 determines whether or not update data is received from the host computer 20 (in step S116). When update data is received (affirmative in step S116), the data read block 343 determines an FCC for the update data and updates data together with the FCC (in step S117), and determines a BCC for the LBA whose data has been updated and updates the LBA together with the BCC (in step S118). When update data is not received (negative in step S116), the process proceeds to step S119.

The CM read block 338 sends the data-transfer-end notification to the CPU 43 via the descriptor block 336 (in step S119). Based on the contents of the received data-transfer-end notification, the CPU 43 issues, to the host computer 20 that gave the instruction for the data operation, a notification indicating whether or not a read error has occurred to the reading of the data from the CM.

Therefore, when variable-length data is read from the data storing cache memory 50A or 50B, data verification based on the block data verification code and the field data verification code is always performed. Thus, there are some advantages. Specifically, it is possible to promptly detect an error in read data. It is possible to prevent data being updated based on read data having an error and also possible prevent the data being written back to the data storing memory without detection of the error. Further, it is possible to enhance the accuracy of data stored in a cache memory 50A or 50B in a channel adapter 40A or 40B.

While the embodiment of the present invention has been described above, the present invention is not limited thereto and may be implemented by various different embodiments within the scope and sprit of the present invention. It should be noted that the advantages described in the embodiment are not limiting.

Of the individual processing described in the above-described embodiment, all or part of the processing described as being performed automatically can also be performed manually or all or part of the processing described as being performed manually can also be performed automatically by a known method. In addition, the processing procedure, the control procedure, the specific names, various data, and information including parameters can be arbitrarily changed, unless otherwise particularly specified.

The elements in each illustrated device are merely functional and conceptual elements, and do not necessarily have to be configured physically as shown in the drawings. That is, the distribution/integration of the devices is not limited to the illustrated specific forms, all or part thereof may be functionally or physically distributed/integrated in any form depending on various loads and the use state.

All or arbitrary part of the processing functions performed by the individual devices may be realized by a CPU (central processing unit) (or an MPU (micro processing unit) or an MCU (micro controller unit)) and a program or programs analyzed and executed by the CPU (or a microcomputer, such as the MPU or MCU), or may be realized by hardware using a wired logic.

What is claimed is:

1. A data access method for writing/reading, in response to an instruction from an external apparatus, data to/from a data-storing memory for managing variable-length data by using a block including predetermined fields, the data access method comprising the step of:
    (a) verifying the variable-length data for each block based on a block data verification code attached to the block and verifying the variable-length data for each field based on a field data verification code attached to the field, during reading of the variable-length data from the data-storing memory; and
    (b) issuing a notification indicating a result of the verification performed in step (a) to the external apparatus.

2. The data access method according to claim 1, wherein the result of the verification comprises block verification information indicating whether or not the variable-length data has been verified for each block based on the block data verification code and field verification information indicating whether or not the variable-length data has been verified for each field based on the field data verification code.

3. The data access method according to claim 2, wherein, when the block verification information indicates that the variable-length data has not been verified or when the field verification information indicates that the variable-length data has not been verified, the result indicated by the notification issued in step (b) is an abnormal result, regardless of the result of the verification performed in step (a).

4. The data access method according to claim 2, wherein the field is read by designating a data length including the field-data verification code attached to the field, and in step (a), when the designation of the data length is erroneous, information indicating that the variable-field data has not been verified is set in the field verification information.

5. The data access method according to claims 1, wherein, when update data is received, update target data to be updated with the update data is read from the data-storing memory, the update target data is verified in step (a), a field of the update target data is then updated with the update data, the field data verification code is updated so as to correspond to the updated field, and the block data verification code corresponding a block containing the updated field is updated.

6. A channel adapter for writing/reading, in response to an instruction from an external apparatus, data to/from a data-storing memory for managing variable-length data by using a block including predetermined fields, the channel adapter comprising:
    a verifying unit configured to verify the variable-length data for each block based on a block data verification code attached to the block and verifying the variable-length data for each field based on a field data verification code attached to the field, during reading of the variable-length data from the data-storing memory; and
    a verification-result-notification issuing unit configured to issue a notification indicating a result of the verification performed by the verifying unit to the external apparatus.

7. The channel adapter according to claim 6, wherein the result of the verification comprises block verification information indicating whether or not the variable-length data has been verified for each block based on the block data verification code and field verification information indicating whether or not the variable-length data has been verified for each field based on the field data verification code.

8. The channel adapter according to claim 7, wherein, when the block verification information indicates that the variable-length data has not been verified or when the field verification information indicates that the variable-length data has not been verified, the result indicated by the notification issued by the verification-result-notification issuing unit is an abnormal result, regardless of the result of the verification performed by the verifying unit.

9. A data access control device for controlling data access for writing/reading, in response to an instruction from an external apparatus, data to/from a data-storing memory that manages variable-length data by using a block including predetermined fields, the data access control device comprising:
    a verifying unit configured to verify the variable-length data for each block based on a block data verification code attached to the block and verifying the variable-length data for each field based on a field data verification code attached to the field, during reading of the variable-length data from the data-storing memory; and
    a verification-result-notification issuing unit configured to issue a notification indicating a result of the verification performed by the verifying unit to the external apparatus.

* * * * *

UNITED STATES PATENT AND TRADEMARK OFFICE
CERTIFICATE OF CORRECTION

| | |
|---|---|
| PATENT NO. | : 7,921,265 B2 |
| APPLICATION NO. | : 12/068355 |
| DATED | : April 5, 2011 |
| INVENTOR(S) | : Ishii et al. |

Page 1 of 1

It is certified that error appears in the above-identified patent and that said Letters Patent is hereby corrected as shown below:

Column 12, Line 9 in Claim 5, delete "claims 1" and insert -- claim 1 --, therefor.

Signed and Sealed this
Twenty-eighth Day of June, 2011

David J. Kappos
*Director of the United States Patent and Trademark Office*